US009722931B2

(12) United States Patent
Basso et al.

(10) Patent No.: US 9,722,931 B2
(45) Date of Patent: Aug. 1, 2017

(54) UNIFIED FRAMEWORK FOR ISOLATING MULTICAST AND BROADCAST FRAMES TO A TRAFFIC CLASS SEPARATE FROM A TRAFFIC CLASS USED FOR UNICAST FRAMES

(71) Applicant: International Business Machies Corporation, Armonk, NY (US)

(72) Inventors: Claude Basso, Nice (FR); Joseph A. Kirscht, Rochester, MN (US); Michel Poret, Valbonne (FR); Ethan M. Spiegel, Mountain View, CA (US); Natarajan Vaidhyanathan, Carrboro, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 14/296,574

(22) Filed: Jun. 5, 2014

(65) Prior Publication Data

US 2015/0358244 A1 Dec. 10, 2015

(51) Int. Cl.
*H04L 12/26* (2006.01)
*H04L 12/851* (2013.01)
*H04L 12/18* (2006.01)
*H04L 12/46* (2006.01)

(52) U.S. Cl.
CPC .......... *H04L 47/2433* (2013.01); *H04L 12/18* (2013.01); *H04L 12/4641* (2013.01); *H04L 12/4645* (2013.01)

(58) Field of Classification Search
CPC . H04L 12/4625; H04L 12/4641; H04L 12/18; H04L 45/32; H04L 47/24; H04L 47/2433; H04L 47/58; H04L 47/6215; H04L 12/4645
USPC ........... 370/229, 235, 389, 395.31, 412, 252
See application file for complete search history.

(56) References Cited

U.S. PATENT DOCUMENTS

| 7,304,996 | B1 | 12/2007 | Swenson et al. |
| 7,451,267 | B1 | 11/2008 | Venkatachary et al. |
| 7,552,275 | B1 | 6/2009 | Krishnan |
| 8,358,651 | B1 | 1/2013 | Kadosh et al. |
| 8,553,582 | B1 | 10/2013 | Mizrahi et al. |

(Continued)

OTHER PUBLICATIONS

U.S. Appl. No. 14/284,859, entitled "Access Control List-Based Port Mirroring Techniques", filed May 22, 2014.

(Continued)

*Primary Examiner* — Kwang B Yao
*Assistant Examiner* — Harun Chowdhury
(74) *Attorney, Agent, or Firm* — Patterson + Sheridan, LLP (57) ABSTRACT

Embodiments presented herein describe techniques for isolating multicast and broadcast frames to a traffic class that is separate from a traffic class used for unicast frames. According to one embodiment, a network switch receives an incoming Ethernet virtual local area network (VLAN)-tagged frame. The switch evaluates priority bits of the VLAN tag of the frame. The switch also determines a type of frame (e.g., whether the frame is unicast, broadcast, multicast, or flood). Based on the priority field values and the type of the frame, the switch identifies a mapping of the frame to a particular traffic class. The network switch assigns the frame to the traffic class.

9 Claims, 5 Drawing Sheets

(56) References Cited

U.S. PATENT DOCUMENTS

| | | | |
|---|---|---|---|
| 8,873,392 B1* | 10/2014 | Orr | H04L 47/2458 370/235 |
| 2003/0198231 A1* | 10/2003 | Kalkunte | H04L 12/5601 370/395.31 |
| 2004/0252722 A1 | 12/2004 | Wybenga et al. | |
| 2005/0114657 A1 | 5/2005 | Kumar et al. | |
| 2005/0220092 A1 | 10/2005 | LaVigne et al. | |
| 2006/0156018 A1 | 7/2006 | Lauer et al. | |
| 2007/0022479 A1 | 1/2007 | Sikdar et al. | |
| 2008/0304498 A1 | 12/2008 | Jorgensen et al. | |
| 2010/0020814 A1* | 1/2010 | Thyni | H04L 12/4625 370/412 |
| 2011/0161580 A1 | 6/2011 | Shah et al. | |
| 2011/0299414 A1* | 12/2011 | Yu | H04L 12/4641 370/252 |
| 2013/0034100 A1 | 2/2013 | Goyal et al. | |
| 2013/0218853 A1 | 8/2013 | Bullis et al. | |
| 2014/0119177 A1* | 5/2014 | Delregno | H04L 41/5022 370/229 |
| 2015/0006808 A1 | 1/2015 | Miller et al. | |
| 2015/0339240 A1 | 11/2015 | Basso et al. | |
| 2015/0341269 A1 | 11/2015 | Basso et al. | |
| 2015/0341270 A1 | 11/2015 | Basso et al. | |
| 2015/0341316 A1 | 11/2015 | Basso et al. | |
| 2015/0341364 A1 | 11/2015 | Basso et al. | |
| 2015/0341365 A1 | 11/2015 | Basso et al. | |
| 2015/0358245 A1 | 12/2015 | Basso et al. | |

OTHER PUBLICATIONS

U.S. Appl. No. 14/284,927, entitled "Skipping and Parsing Internet Protocol Version 6 Extension Headers to Reach Upper Layer Headers", filed May 22, 2014.

U.S. Appl. No. 14/284,788, entitled "Atomically Updating Ternary Content Addressable Memory-Based Access Control Lists", filed May 22, 2014.

U.S. Appl. No. 14/284,811, entitled "Supporting Access Control List Rules That Apply to TCP Segments Belonging to 'Established' Connection", filed May 22, 2014.

International Business Machines Corporation, "List of IBM Patents and Applications Treated as Related," May 31, 2016, 2 pages.

* cited by examiner

UNIFIED FRAMEWORK FOR ISOLATING MULTICAST AND BROADCAST FRAMES TO A TRAFFIC CLASS SEPARATE FROM A TRAFFIC CLASS USED FOR UNICAST FRAMES

BACKGROUND

Networked devices (e.g., a layer 2 switch) that support certain IEEE standards and quality of service prioritization schemes may receive and process Ethernet frames that include virtual local area network (VLAN) tagging. Typically, a VLAN tag in an Ethernet frame header includes a 3-bit field that defines priority. The switch may use the value of these priority bits to differentiate incoming traffic. The switch often handles different types of incoming frames, such as unicast, multicast, broadcast, and flood frames. Unicast frames are frames that are sent from a single source and are intended for a single destination in a network. In comparison, broadcast and multicast frames are generally intended for multiple destinations in a network. Flood frames are frames for which no destination is found and therefore are broadcasted to all destinations. Typically, when a switch receives an incoming frame that is VLAN-tagged, the switch forwards the frame to a buffer pool for further processing (e.g., for replication in the case of broadcast or multicast frames). The buffer pools may be separated by traffic class. Unicast frames typically require less processing than broadcast or multicast frames.

Typically, a switch determines a traffic class for a given frame based solely on priority bits identified in the VLAN tag. Consequently, unicast frames, which require less processing than multicast frames or broadcast frames, may be assigned to similar traffic classes as multicast or broadcast frames, which require more processing than unicast frames. That is, this approach determines a traffic class independently from the type of frame. Compared to unicast frames, processing multicast or broadcast frames may be more computationally expensive. For example, assume that frames with a priority bit value of 1 are assigned to traffic class 5. If the switch receives relatively few incoming multicast frames, then unicast frames may flow easily through the switch. However, if the switch receives considerably more incoming multicast frames, the unicast frames may take longer time to flow through the switch.

SUMMARY

One embodiment presented herein includes a method. The method generally includes receiving an incoming virtual local area network (VLAN)-tagged Ethernet frame. The method also includes evaluating a priority bit field of the frame, determining a type of the frame, and identifying a mapping to a traffic class based on the priority bit field and the type of the frame.

Another embodiment includes a computer program product, itself comprising a computer-readable storage medium having computer-readable program code embodied therewith, the computer-readable program code configured to perform an operation. The operation generally includes receiving an incoming VLAN-tagged Ethernet frame. The operation also includes evaluating a priority bit field of the frame, determining a type of the frame, and identifying a mapping to a traffic class based on the priority bit field and the type of the frame.

Still another embodiment includes a processor and a memory storing a program, which, when executed on the processor, performs an operation. The operation generally includes receiving an incoming VLAN-tagged Ethernet frame. The operation also includes evaluating a priority bit field of the frame, determining a type of the frame, and identifying a mapping to a traffic class based on the priority bit field and the type of the frame.

DETAILED DESCRIPTION

Embodiments presented herein provide techniques for determining a traffic class for incoming virtual local area network (VLAN)-tagged Ethernet frames based on a type of Ethernet frame and the priority bits in a VLAN tag of the frame header. More specifically, embodiments provide techniques for forwarding broadcast and multicast frames into traffic classes separate from unicast frames. In one embodiment, a switch (or other networking device) receives an incoming frame. The switch evaluates the priority bits in a VLAN tag of the frame using a mapping table provided in the switch. In addition, the switch determines a type of the frame (e.g., unicast, multicast, broadcast, flood). If the frame is a broadcast, a multicast, or a flood frame, the switch determines a traffic class based on an additional mapping table provided in the switch. If the frame is a unicast frame, then the switch determines the traffic class without using the additional mapping table. Further, an access control list may override any decisions made by the switch.

Note, the following description relies on a distributed network switch as a reference example of a networking device that isolates multicast and broadcast frames from unicast frames when assigning frames to traffic classes. However, one of skill in the art will recognize that techniques are applicable in other contexts related to separating Ethernet frames based on type. For example, the techniques may also generally be adapted to other networking devices that separate Ethernet frames based on quality of service policies.

Figure 1:
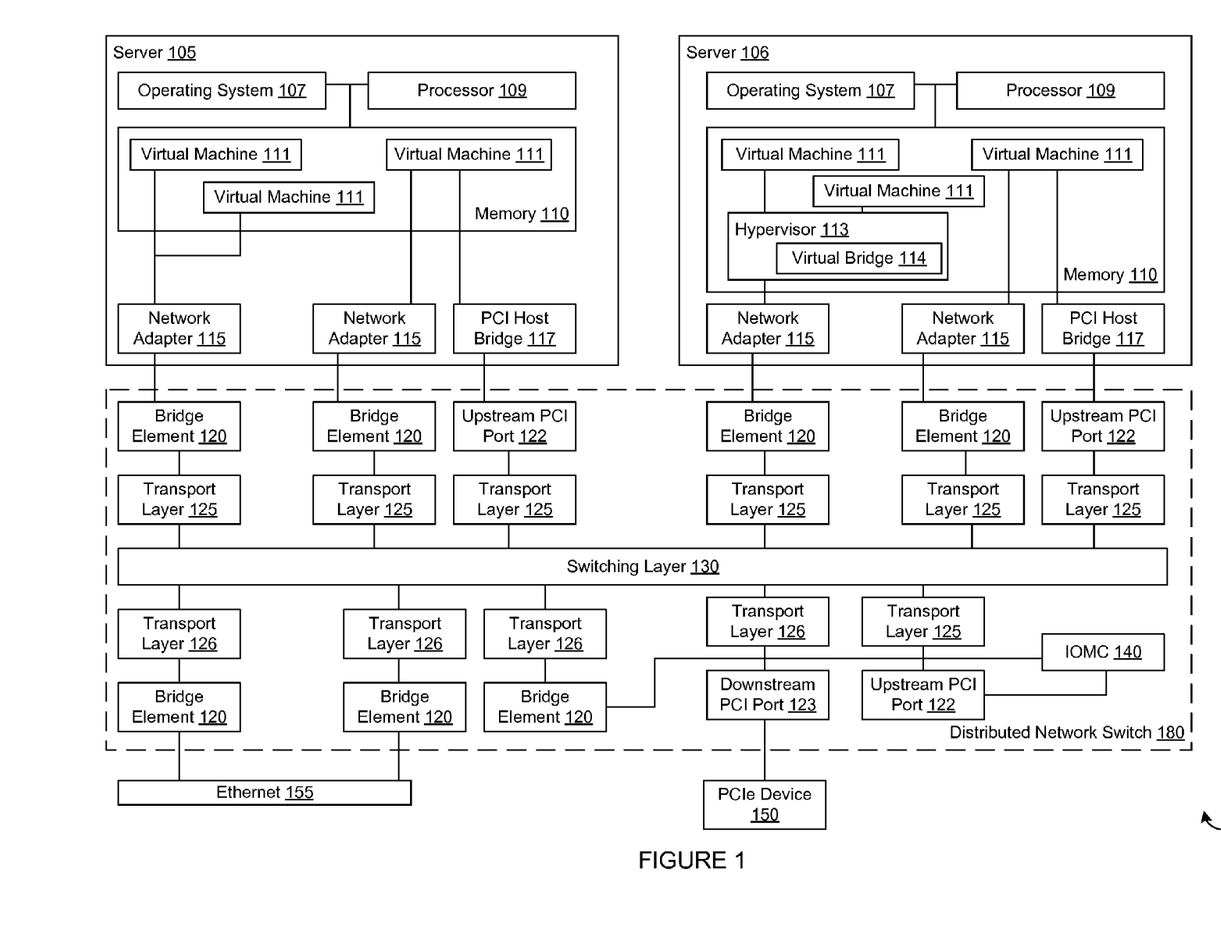
FIG. 1 illustrates a system architecture that includes a distributed network switch, according to one embodiment.

FIG. 1 illustrates a system architecture 100 that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

Figure 2:
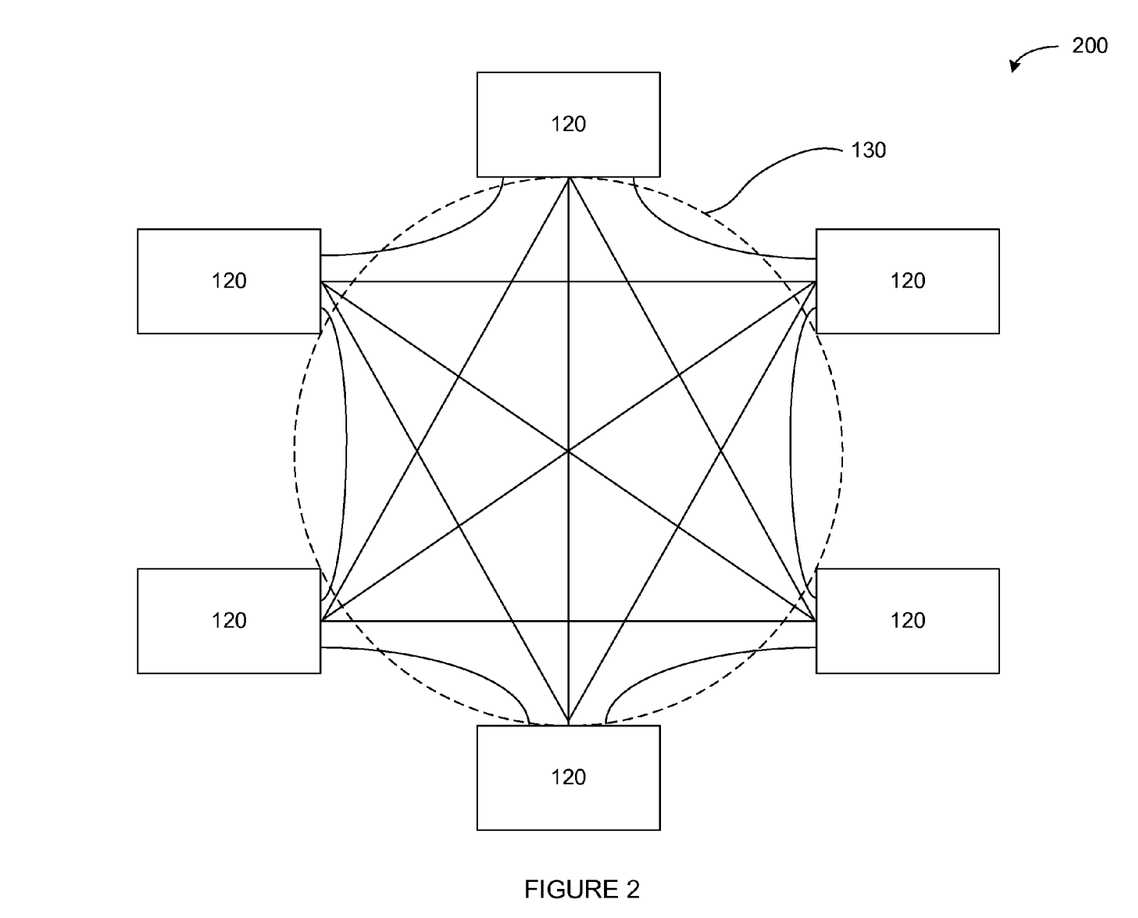
FIG. 2 illustrates components of a distributed network switch, according to one embodiment.

FIG. 2 illustrates a virtual switching layer, according to one embodiment. Each bridging element 120 in the system 100 is connected to each other using the switching layer 130 via a mesh connection schema. That is, no matter the bridging element 120 used, a cell (i.e., data packet) can be routed to another bridging element 120 located on any other switch module. This may be accomplished by directly connecting each bridging element 120—i.e., each bridging element 120 has a dedicated data path to every other bridging element 120.

In one embodiment, each switch module is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 3:
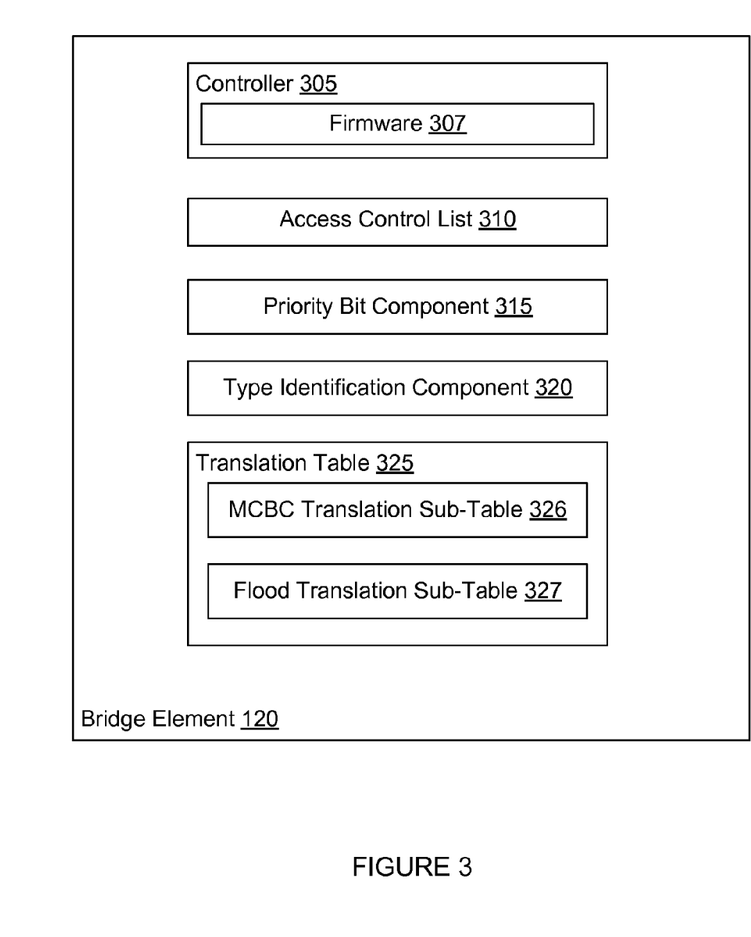
FIG. 3 illustrates a bridge element configured to separate virtual local area network (VLAN)-tagged Ethernet frames into traffic classes, according to one embodiment.

FIG. 3 illustrates a bridge element 120 configured to assign incoming frames to traffic classes based on priority bits and a type of each incoming frame, according to one embodiment. Each traffic class maintains a portion of a buffer pool that stores frames for further processing, such as for replicating multicast frames. As shown, the bridge element 120 includes a controller 305, an access control list 310, a priority bit component 315, a type identification component 320, and a translation table 325. The translation table itself includes two sub-tables: a multi-cast/broadcast (MCBC) translation table 326 and a flood translation sub-table 327.

The controller 305 includes firmware 307. The firmware 307 provides various modules for managing components of the bridge element 120, such as the access control list 310. The access control list 310 is a strictly ordered list of rules applied to port numbers of IP or Media Access Control (MAC) addresses to filter incoming network traffic and provide security. In one embodiment, the access control list may be implemented using a ternary content addressable memory.

The priority bit component 315 evaluates a 3-bit priority field in an incoming VLAN-tagged Ethernet frame to determine a priority level of the frame. Values for priority level are from 0 (lowest) to 7 (highest). In addition, the priority bit component 315 also determines an initial mapping of frames to a traffic class. The bridge element 120 may use the values to prioritize different classes of traffic (e.g., voice, video, data, etc.). The type identification component 320 evaluates properties of the frame (e.g., headers, source/destination information, and the like) to determine whether the frame is a unicast, broadcast, multicast, or flood frame.

The translation table 325 provides mappings of priority field and type information of frames to traffic classes. The controller 305 evaluates the output from the priority bit component 315 and the type identification component 320 using the translation table 325 to determine a traffic class to forward the frame. The translation sub-tables 326 and 327 ensure that the bridge element 120 forwards frames that require fewer resources (e.g., unicast frames) to traffic classes isolated from frames that require greater resources (e.g., multicast and broadcast frames), even if both types of frames share similar priority field values. The flood translation sub-table 327 determines whether a flood frame is assigned to the previously identified traffic class or should further be analyzed through the MCBC translation sub-table 326. The MCBC translation sub-table 326 determines mappings of broadcast frames and multicast frames to a traffic class. Further, based on the output of the flood translation sub-table 327, the MCBC translation sub-table 326 also determines mappings of flood frames.

In one embodiment, the access control list 310 may override any decisions made through the translation table 325. In such a case, the bridge element 120 may bypass lookup in the translation table 325 and performs any forwarding actions specified in the access control list 310 instead.

Figure 4:
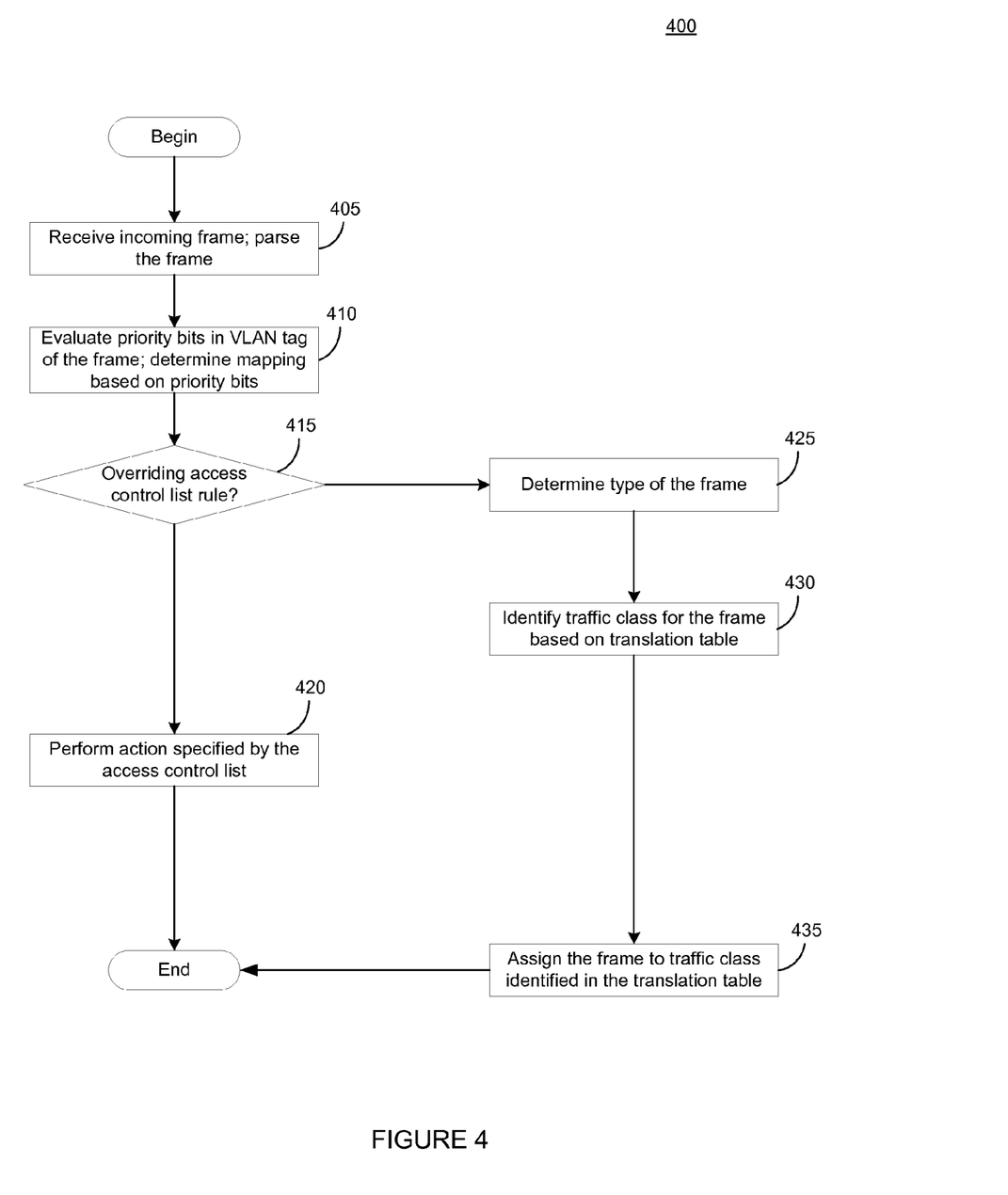
FIG. 4 illustrates a method for isolating broadcast and multicast frames into traffic classes separately from unicast frames, according to one embodiment.

FIG. 4 illustrates a method 400 for isolating broadcast and multicast frames into traffic classes separately from unicast frames, according to one embodiment. Method 400 begins at step 405, where the bridge element 120 receives an incoming VLAN-tagged Ethernet frame. The bridge element 120 parses the frame (e.g., headers, parameters, and so on).

At step 410, the priority bit component 315 evaluates the priority bit field of the VLAN tag. In addition, the priority bit component 315 determines an initial mapping of the frame to a traffic class based on the priority values. The priority bit component 315 outputs the information to a feeder component in the bridge element 120.

At step 415, the bridge element 120 determines whether any rule condition in the access control list 310 applies to the frame (e.g., based on frame properties). If such a rule condition exists, then the bridge element 120 bypasses any further traffic class determinations. Instead, at step 420, the bridge element 120 performs an action on the frame corresponding to the rule specified in the access control list. By performing an ACL lookup before determining a type of the frame, the ACL remains type agnostic. That is, the ACL is unaware whether the frame is unicast, broadcast, multicast, etc.

If no overriding rule exists in the access control list, then at step 430, the type identification component 320 determines whether the frame is a unicast, broadcast, multicast, or flood frame. To do so, the type identification component 320 may evaluate parameters of the frame, such as frame headers, source and destination addresses. For example, if the frame specifies a single destination address, the type identification component 320 may identify the frame as a unicast frame. As another example, if the frame includes a destination address that is unknown by the distributed switch 180, then the type identification component 320 may identify the frame as a flood frame. The type identification component 320 outputs the type information to a feeder component in the bridge element 120.

At step 430, the bridge element 120 identifies a traffic class to assign to the frame, based on the output produced by the priority bit component 315 and the type identification component 320. If the type corresponds to a unicast frame, then the bridge element 120 uses the initial mapping to a traffic class provided by the priority bit component 315. Otherwise, if the type corresponds to a broadcast, a multicast frame, or a flood frame, then the bridge element 120 uses the translation table 325 to determine a mapping based on the priority field value and type. The mappings in the translation table 325 ensure that broadcast, multicast, and some types of flood frames, which typically require more resources of the distributed switch 180, are forwarded to traffic classes separate from traffic classes assigned to unicast frames. Once identified, at step 435, the bridge element 120 forwards the frame to the identified traffic class.

Figure 5:
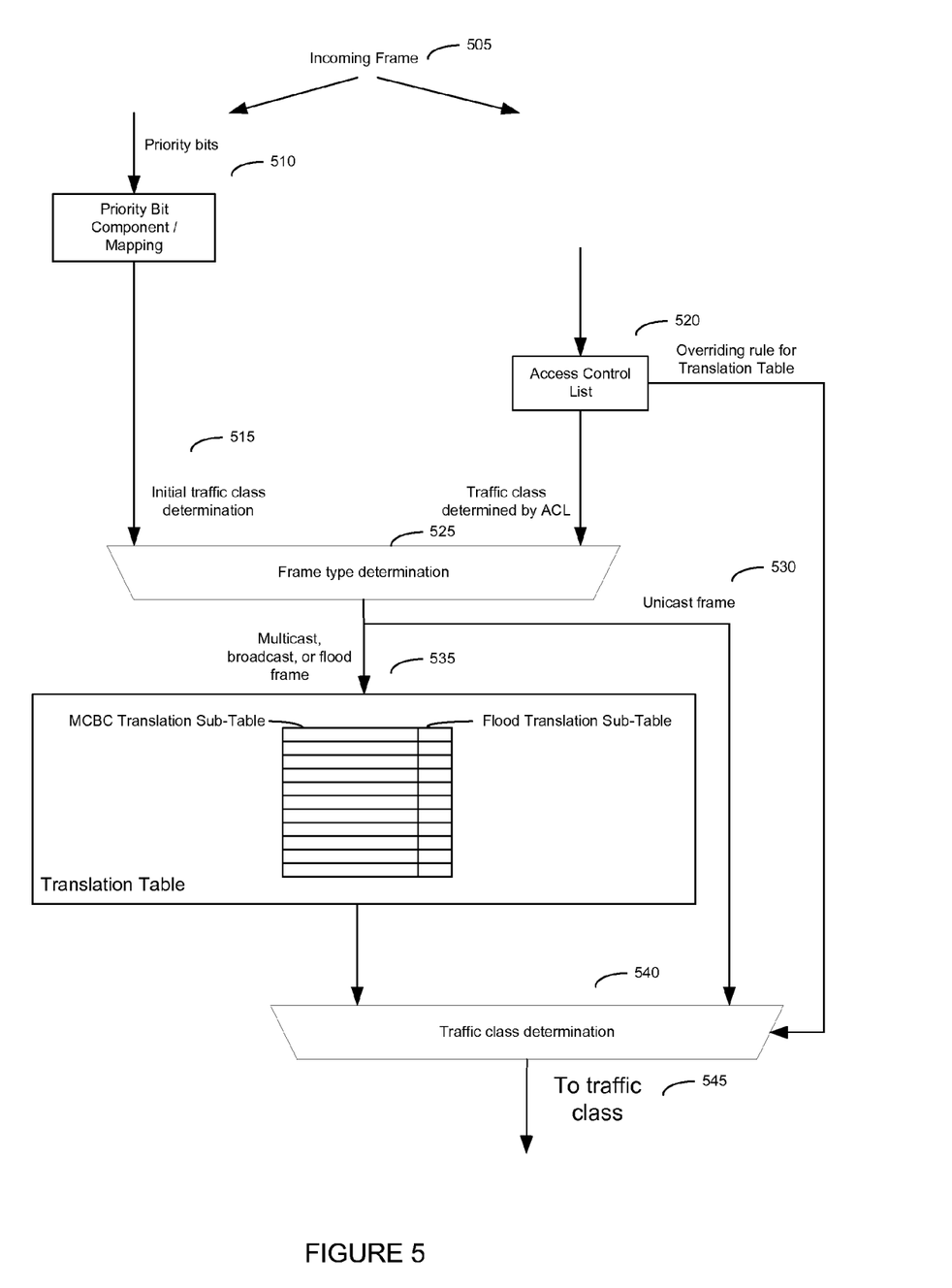
FIG. 5 illustrates a conceptual diagram of assigning a VLAN-tagged Ethernet frame to a traffic class based on a priority field and type of the frame, according to one embodiment.

FIG. 5 illustrates a conceptual diagram of forwarding an incoming Ethernet frame towards a traffic class based on a VLAN priority field and a type of the frame, according to one embodiment. At 505, the bridge element 120 receives an incoming Ethernet frame.

The bridge element 120 parses the priority bits from a VLAN tag of the frame (at 510), and the priority bit component 315 determines an initial traffic class (at 515). In addition, the bridge element 120 determines whether any rule in the access control list 310 overrides any further traffic class determinations (at 520), such as determining a specific traffic class and/or determining that the translation table 325 should be bypassed. If so, the bridge element 120 bypasses other traffic class determinations and performs any corresponding action specified by the access control list 310, such as forwarding to a specified traffic class (at 545).

Otherwise, at 525, the type identification component 320 parses frame properties to determine a type of the frame (e.g., unicast, flood, multicast, broadcast, and the like). If the frame is a broadcast, a multicast frame, or a flood frame that is determined to be handled as a broadcast or multicast frame (via the flood translation sub-table 327), then the bridge element 120 determines a mapping of priority bits and frame to a traffic class through the translation table 325 (at 535). If the frame is a unicast or a flood frame that is determined, via the flood translation table 327, to be handled as a unicast frame (i.e., without changing the initially identified traffic class), then the bridge element 120 bypasses any further lookup of the MCBC translation sub-table 326 (at 530).

The MCBC translation sub-table 326 may be configured to assign broadcast, multicast, and some types of flood frames into traffic classes separate from traffic classes used for unicast frames (e.g., identified in the priority bit mapping at 510). At 540, the bridge element 120 identifies a traffic class based on the mappings. At 545, the bridge element 120 assigns the frame to the identified traffic class.

Advantageously, embodiments presented herein provide techniques for isolating broadcast and multicast frames into traffic classes that are separate from unicast frames. Because the networking device evaluates a type of an incoming Ethernet frame in addition to a VLAN priority field of the frame, the additional mapping table provided may be configured to map broadcast and multicast frames to traffic classes unused by unicast frames. Doing so allows unicast frames to be processed efficiently. Further, because type determinations are performed after access control list lookup, the access control list remains frame type-agnostic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory storing a program, which, when executed on the processor, performs an operation, the operation comprising:
      receiving an incoming virtual local area network (VLAN) tagged Ethernet frame,
      evaluating a priority bit field of the frame,
      upon determining the frame satisfies one of a plurality of overriding conditions in an access control list (ACL), performing an action on the frame based on a rule specified in the ACL that corresponds to the overriding condition, and
      upon determining the frame does not satisfy any overriding condition in the ACL:
         upon determining that a type of the frame is a multicast or broadcast frame, evaluating at least a first translation table specifying a mapping between the frame and a traffic class based on the type of the frame and the priority bit field, wherein the traffic class is unused by unicast frames.

2. The system of claim 1, wherein the operation further comprises, assigning the frame to the traffic class specified in the mapping.

3. The system of claim 1, wherein the type of frame specifies that the frame is one of a unicast, multicast, broadcast, or flood frame.

4. The system of claim 1, wherein identifying the mapping comprises:
   determining that the type of the frame is a flood frame; and
   determining the mapping via a second translation table.

5. A computer program product, comprising:
   a non-transitory computer-readable storage medium having computer-readable program code embodied therewith, the computer-readable program code configured to perform an operation, the operation comprising:
      receiving an incoming virtual local area network (VLAN) tagged Ethernet frame,
      evaluating a priority bit field of the frame,
      upon determining the frame satisfies one of a plurality of overriding conditions in an access control list (ACL), performing an action on the frame based on a rule specified in the ACL that corresponds to the overriding condition, and
      upon determining the frame does not satisfy any overriding condition in the ACL:
      upon determining that a type of the frame is a multicast or broadcast frame, evaluating at least a first translation table specifying a mapping between the frame and a traffic class based on the type of the frame and the priority bit field, wherein the traffic class is unused by unicast frames.

6. The computer program product of claim 5, wherein the operation further comprises, assigning the frame to the traffic class specified in the mapping.

7. The computer program product of claim 5, wherein the type of frame specifies that the frame is one of a unicast, multicast, broadcast, or flood frame.

8. The computer program product of claim 5, wherein identifying the mapping comprises:
   determining that the type of the frame is a flood frame; and
   determining the mapping via a second translation table.

9. The computer program product of claim 5, wherein the traffic class provides a subset of a shared buffer pool of frames.

\* \* \* \* \*